United States Patent [19]
Lloyd

[11] Patent Number: 5,119,482
[45] Date of Patent: Jun. 2, 1992

[54] FLIGHT SYSTEM FOR CONVERTING 12 VOLTS 32-BIT INS DATA INTO 5 VOLTS 8-BIT DATA PATTERN IN REAL TIME

[75] Inventor: John W. F. Lloyd, Townsend, Mass.

[73] Assignee: The United States of America as represented by the Secretary of the Air Force, Washington, D.C.

[21] Appl. No.: 452,662

[22] Filed: Dec. 18, 1989

[51] Int. Cl.⁵ .................. G06F 3/05; G06F 13/40; G06F 13/42

[52] U.S. Cl. .................. 395/325; 364/232.4; 364/237.8; 364/240.8; 364/260.6; 364/260.7; 364/269.9; 364/231.31; 364/DIG. 1

[58] Field of Search ............. 364/200, 900, 449, 452, 364/460; 370/112; 382/41

[56] References Cited

U.S. PATENT DOCUMENTS

| | | | |
|---|---|---|---|
| 4,253,150 | 2/1981 | Scovill | 364/449 |
| 4,283,763 | 8/1981 | Bylinsky et al. | 364/449 |
| 4,312,041 | 1/1982 | DeJonge | 364/442 |
| 4,433,387 | 2/1984 | Dyer et al. | 364/900 |
| 4,513,378 | 4/1985 | Antkowiak | 364/450 |
| 4,604,711 | 8/1986 | Benn et al. | 364/900 |
| 4,631,750 | 12/1986 | Gabriel et al. | 382/41 |
| 4,642,775 | 2/1987 | Cline et al. | 364/443 |
| 4,710,922 | 12/1987 | Scott | 370/112 |

Primary Examiner—Thomas C. Lee
Assistant Examiner—Daniel Pan
Attorney, Agent, or Firm—William G. Auton; Donald J. Singer

[57] ABSTRACT

An inertial Navigation System (INS) data interface box allows the transfer of INS data to standard commercial computer (i.e. Personal Computer or PCs) for flexible in-flight use of data received from the INS. The data box includes a means connected to the data bus for changing the INS output from 12 to 5 volts. The data of interest is then applied to a Label/Decode circuit which in turn directs the data to a Write Address Generator circuit which then applies the data to a Page One Memory Buffer circuit. After the data is filed in the Page One Memory Buffer, the Write Address Generator directs a Page Control circuit to turn to a Page Two Memory Buffer to accept the next cycle of data. During the interim data can be read out of the Page One buffer and converted to 8 bit words for applications to the PC. Should the 8 Bits Converter be processing data, "page flips" is inhibited to prevent readout from the Page Two Buffer from mutilating Page One Buffer data as it is being read out. The PC requests a cycle of data by sending a "P" to Bit Converter circuit causing the Read Address Generator to read a cycle of data out of the Page Memory Buffer which is not accepting input data.

2 Claims, 15 Drawing Sheets

FIG. 1

FIG. 2 CARD I INS BUS INTERFACE

WRITE ADDRESS GENERATOR
CARD III

FIG. 3

CARD III, MEMORY

FIG. 5

CARD IV

FIG. 7
READ MEMORY ADDRESS GENERATOR

INPUT TIMING DIAGRAM

FIG. 10

FLIGHT SYSTEM FOR CONVERTING 12 VOLTS 32-BIT INS DATA INTO 5 VOLTS 8-BIT DATA PATTERN IN REAL TIME

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to inertial navigation systems (INS), and more specifically to an inertial navigation system data interface box which allows the transfer of INS data to a personal computer for flexible use of data received from an operating INS.

An inertial navigation system, such as those produced by Sperry, Inc., is a self-contained system which can automatically determine the position, velocity, and attitude of a moving vehicle for the purpose of directing its future course. Based on prior knowledge of time, gravitational field, initial position, initial velocity, and initial orientation relative to a known reference frame, an inertial guidance system is capable of determining its present position, velocity, and orientation without the aid of external information. The generated navigational data is used to determine the future course for a vehicle to follow in order to bring it to its destination. Such systems have found application in the guidance and control of submarines, ships, aircraft, missiles, and spacecraft.

Currently INS systems provide data to special purpose (navigation) computers generally without data recording capability. In a few cases special hardware has been designed to allow for onboard recording of INS data for subsequent off-line processing of flight data.

There exists a growing need for INS data to be available to standard personal computers. For example, research aircraft equipped with inertial navigation systems (INS) are used in a large variety of research missions. The real-time availability of INS data to inexpensive personal computers (PCs) would provide a flexible in-flight research asset.

The task of providing INS data to personal computers is alleviated, to some extend, by the systems disclosed in the following U.S. Patents, the disclosure of which are specifically incorporated herein by reference:

U.S. Pat. No. 4,312,041 issued to DeJonge;
U.S. Pat. No. 4,604,711 issued to Benn; and
U.S. Pat. No. 4,642,775 issued to Cline.

The patent to DeJonge (041) teaches a flight data system comprising a control and display unit connected to a computer. The patent to Benn (711) teaches a flight data system having an interface circuit for reformatting flight data from the flight recorder. Finally, the patent to Cline (775) teaches a flight data system wherein an on board computer is connected via telephone lines to a ground base center. The data center generates a series of optimized flight plans for pilot information and use.

While the above-cited patents are instructive, the task remains to provide a general purpose interface which provides INS data to standard commercial computers. The present invention is intended to satisfy that need.

SUMMARY OF THE INVENTION

The present invention provides a means for interfacing inertial navigation systems with commercially-available personal computers using: a buffer, a label decode circuit, a series to parallel unit, memory pages #1 and #2, a page control circuit, a write address generator, a read address generator, a universal asynchronous receive and transmit chip (UART), a Baud rate generator, and an RS 232 C line.

The RS 232 C line is commonly used by most modems to transmit information to and from personal computers over ordinary telephone lines. In this application, the Baud rate generator, UART, and RS 232 C line are applied to transfer data from a commercially-available INS to a personal computer, after two problems are solved as follows. The Carousel IV INS outputs navigation data in a sequential stream of 32 bit words which are at a 12 volt level. Since personal computers process 8 bit word blocks at 5 volt level, the present invention will electronically modify the INS data stream in the manner discussed below.

As mentioned above, the Carousel IV INS produces output signals composed of 32 bit words at a 12 volt level on an INS bus. The buffer is connected to the INS bus, and reduces the INS output signals to a 5 volt level, and thereby produces output signals composed of serial 32 bit words at a 10K baud rate.

The label decode circuit is connected to the buffer, and produces output signals by receiving and passing only the buffer output signals which represent latitude, longitude, true heading and ground speed. Each 32 bit word is then broken up into four 8 bit words, which are forwarded by the series to parallel unit to the memory pages #1 and #2. The page control circuit alternates the reception of cycles of data between the page #1 and page #2 memories.

The write address generator receives and identifies the type of navigation word from the label decode circuit as the output of the label decode goes into the memory. When the data is forwarded from the memory to the UART, the write address generator identifies the type of data in the word to the read address generator, which forwards this information to the UART.

The UART receives the INS data in serial 8 bit words from the memory pages #1 and #2, along with a 2400 Baud rate signal from the Baud rate generator, and outputs the INS data in serial 8 bit words through the RS 232 C line to the personal computer at a 2400 baud rate. In this manner, the present invention allows the transfer of INS data to any personal computer which is able to receive data from a modem over an RS 232 C line. The advantages of this transfer includes the opportunity for flexible in-flight use of data received from the INS.

It is an object of the present invention to make INS data accessible to personal computers for real-time use of the data by computers for in-flight analysis and decision making.

It is another object of the present invention to help facilitate on-board data analysis on airborne data gathering missions by providing researchers with personal computer access to INS data.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is an INS data interface box which allows the transfer of INS data to standard commercial computers (small PCs) for flexible in-flight use of the data for the many applications. This invention is a major improvement over previous solutions, permitting the quick reformatting/use of INS data in response to changing research requirements.

Figure 1:
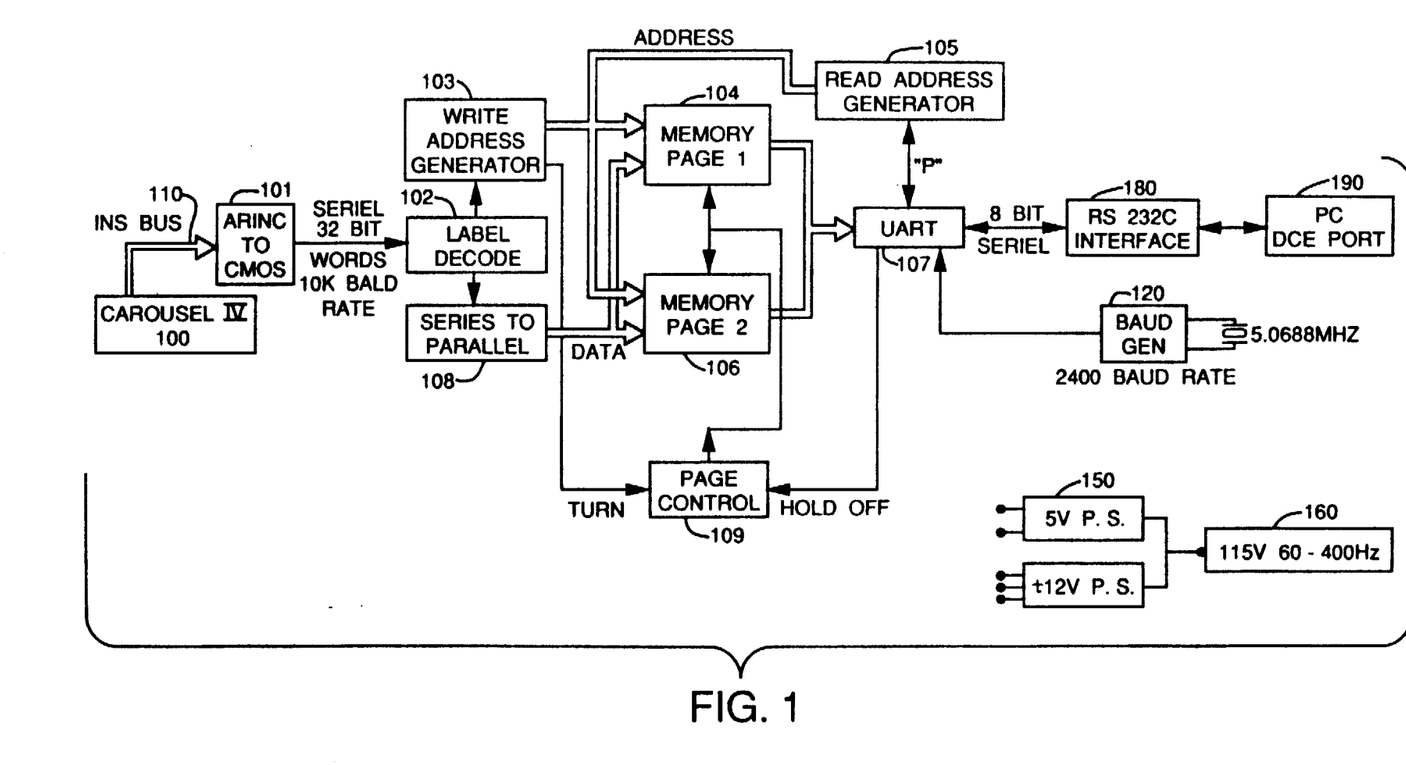
FIG. 1 is a block diagram of the present invention.

The reader's attention is now directed towards FIG. 1. which is a block diagram of the present invention. The system of FIG. 1 is electrically connected to the Carousel IV INS 100, by the INS BUS 110, which carries a sequential stream of 32 bit words from the INS which are at a 12 volt level. As discussed below, the present invention changes the INS output from a 12 volt level into a 5 volt level, and outputs this data in 8 bit word blocks on an RS 232 C line into most standard commercial personal computers, such as the Zenith 100.

The signals from the INS bus 110 are reduced to a 5 volt level by a buffer 101, which outputs serial 32 bit words at a 10K baud rate. The first eight bits of each word is a label that identifies the parameter described by that word. The label decode block 102 looks at each label as the word comes in, and passes it on to the memory 104 only if it is one of the four words that this interface box accepts. These four words are: latitude, longitude, true heading, and ground speed.

When a word is accepted by the label decode block 102, it is broken up into four 8 bit words. An address is written for each of the 8 bit words by the address generator 103, and they are written in parallel format and forwarded by the series to parallel unit 108 to the memory pages 104 and 106. After the data is filed in the Page 1 Memory Buffer, the Write Address Generator 103 directs a Page Control circuit to turn to a Page Two Memory Buffer 106 to accept the next cycle of data. During the interim data can be read out of the Page One buffer and converted to 8 bit words for applications to the PIC. Should the 8 Bits Converter be processing data, "page flips" is inhibited to prevent readout from the Page Two Buffer from mutilating Page 1 Buffer data as it is being read out. The PC requests a cycle of data by sending a "P" to Bit Converter circuit causing the Read Address Generator to read a cycle of data out of the Page Memory Buffer which is not accepting input data.

The page control's function 109 is to alternate the two pages of the memory between the input and output sections of the interface. The page is changed after four consecutive input words are accepted. A hold off control from the UART 107 will prevent a page change if the UART is in the middle of a readout sequence. Thus when the interface is working the double memory arrangement will introduce a delay of one INS bus cycle time in the data stream, but since the output data rate is usually about one tenth or less of the cycle time, the delay is not significant.

A single card contains the memory chips 104 and 106 and the page control circuit 109. The timing of this part of the interface box is under the control of the Carousel IV which provides clock and word sync signals as part of the INS bus 110. Another card contains the output side of the interface that is under control of the computer 190 through the RS 232 C port 180. The timing signals for this half of the interface are derived from the baud rate generator 120. The output sequence is initiated by a "P" signal being sent to the UART (Universal Asynchronous Receive and Transmit) chip 107 through the RS 232 C port 180. The "P" (for position) starts the memory read address generator 105. The generator goes through sixteen addressed reading out the four parameters stored in the memory Page that is not being used by the input section of the interface. These addresses are needed since each parameter is recorded as four 8 bit words.

In the system of FIG. 1, an RS 232 C interface 180 electrically connects the UART 107 to the personal computer 190. RS 232 C interfaces are commonly used to provide data from modems to personal computers, but in FIG. 1 the data is taken from the Carousel IV inertial navigation system rather than being received from telephone wires. The advantage of this invention is that it will make navigation data from an aircraft inertial navigator available to an inexpensive personal computer for real time display manipulation and storage during flight. As mentioned above, the inertial navigator provides latitude, longitude, ground speed and true heading for viewing by the navigator. For research tasks, there is a desire to: 1) record all readings for the entire flight for later analysis; 2) to observe data and to convert it for further computation of range and azimuth of plane from radar station in real time. These tasks are easily performed with an interface circuit attached to enable use of an inexpensive PC without changing the INS in any way.

A prototype of the system of FIG. 1 was made up of five printed circuit cards and associated connectors, power supplies and indicator lights. There are no manual controls on the interface box itself. The INS serial bus from the Carousel IV carries a sequential stream of 32 bit words. Each word on the bus gives the present value of one parameter such as latitude, longitude, etc. The availability of these parameters on the bus is determined by the program set into the Carousel IV where it is installed in the aircraft. Card I buffers the signals from the bus and converts the voltage levels to +5 volts. The second card contains the label decode 102, write address 103, and series to parallel blocks 108 of FIG. 1. Card III contains the memory chips 104 and 106 and page control circuit. Card IV contains the output side of the interface, and is under the control of the personal computer 190. The power for the interface box is derived from a 115 V 60-400 Hz power source 160, which is converted to a 5 volt and 12 volt levels by the power supply 150. Details of the electrical connections of these cards are described below.

Figure 2:
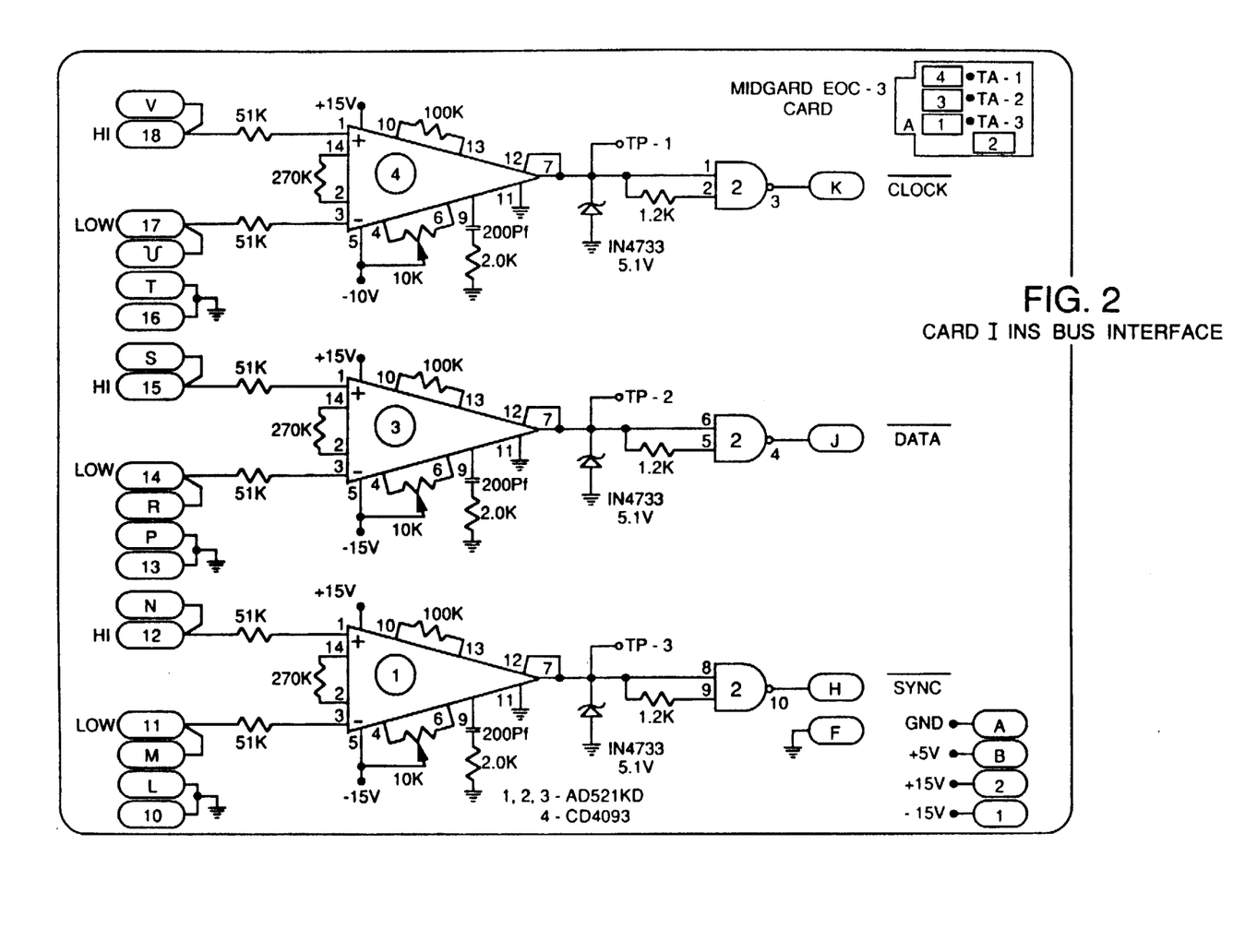
FIG. 2 is an electrical schematic of Card I used in the present invention.
Figure 3:
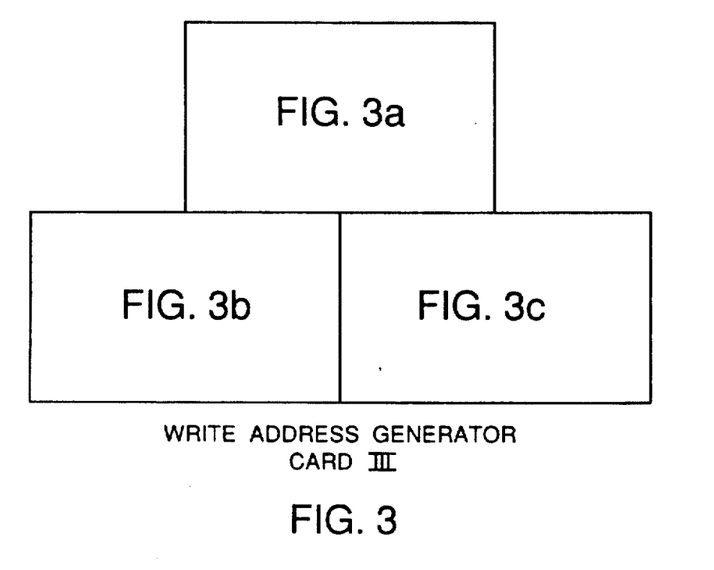
FIG. 3 is a map illustration which shows how FIGS. 3a-3c fit together.
Figure 3A:
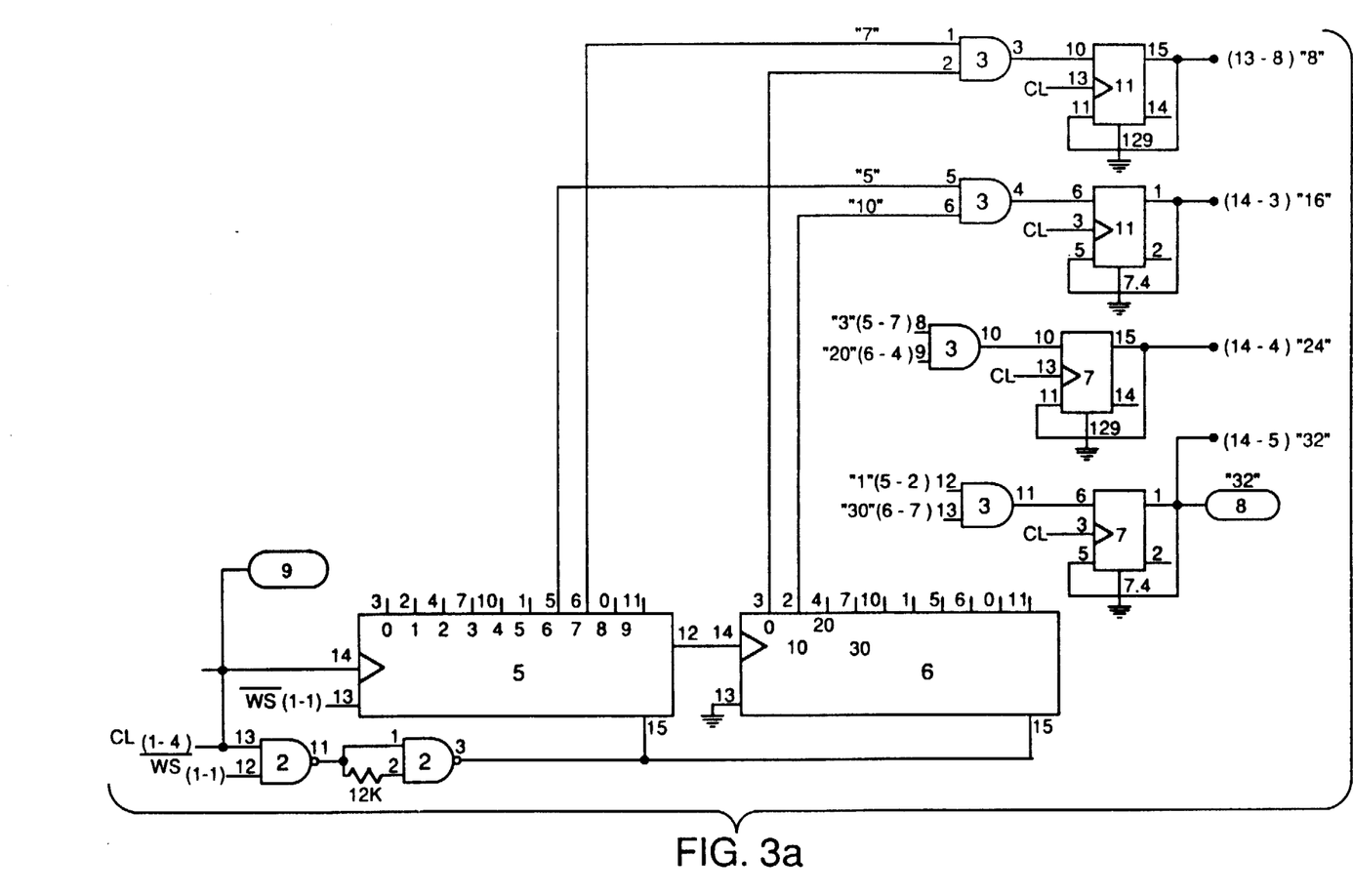
FIGS. 3a-3c combine to form an electrical schematic of the Write Address Generator of Card II.
Figure 3B:
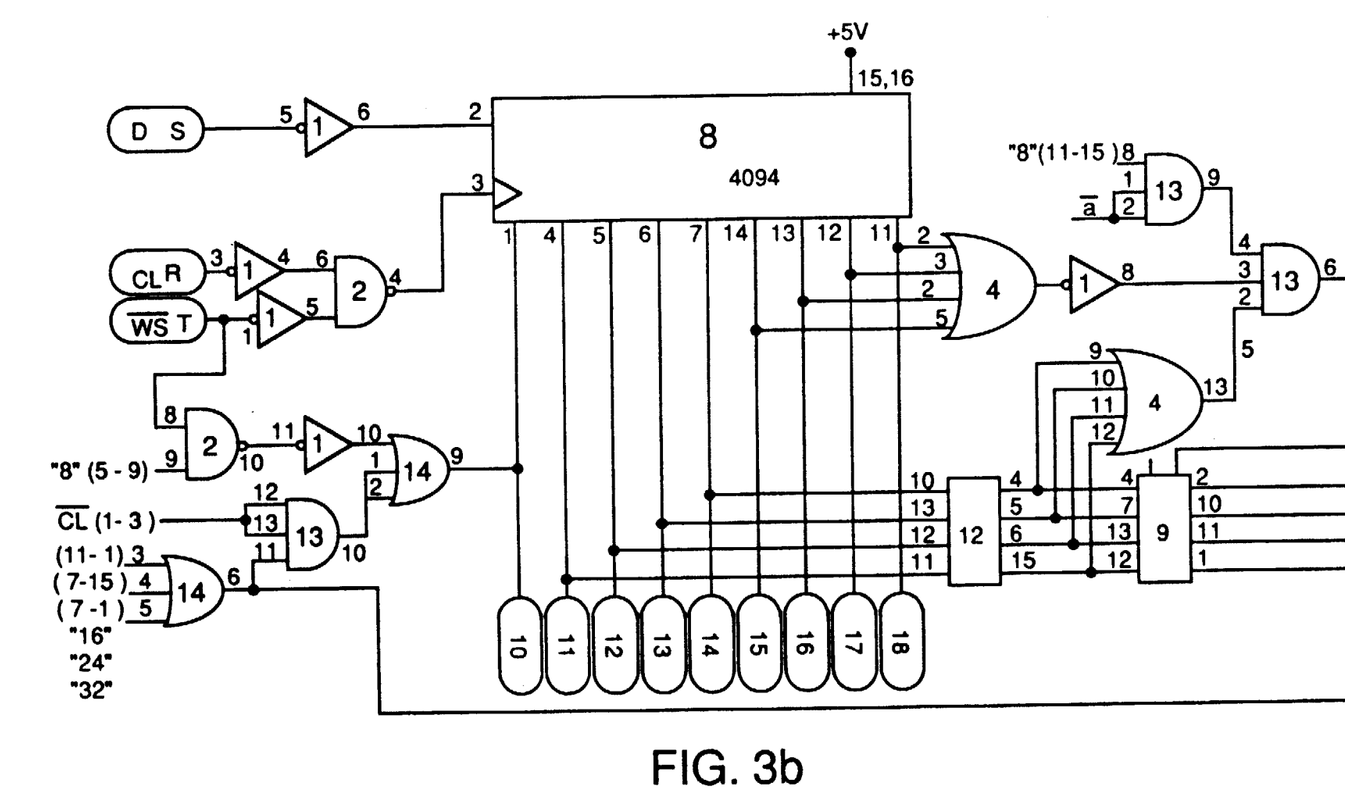
Figure 3C:
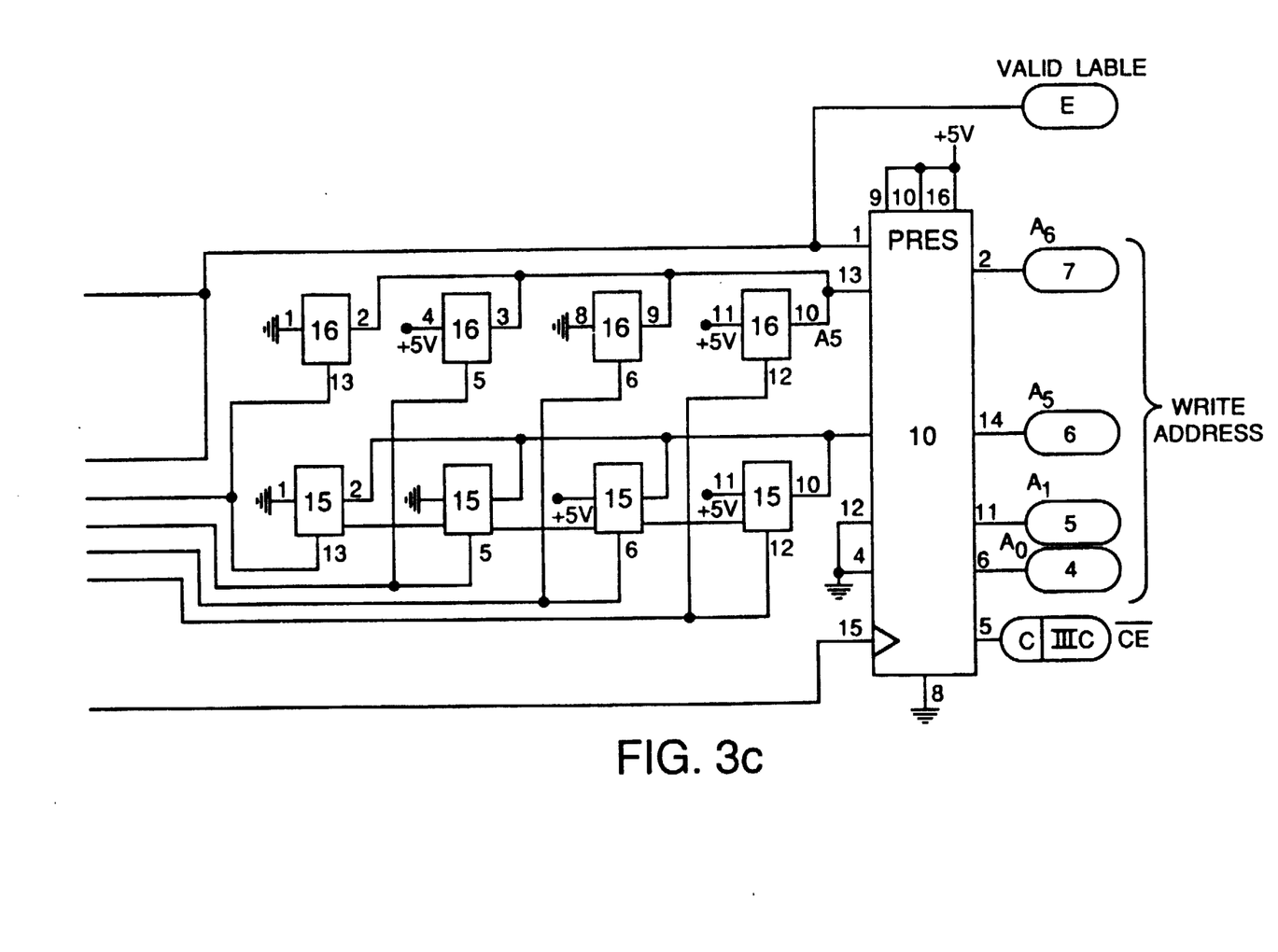
Figure 4:
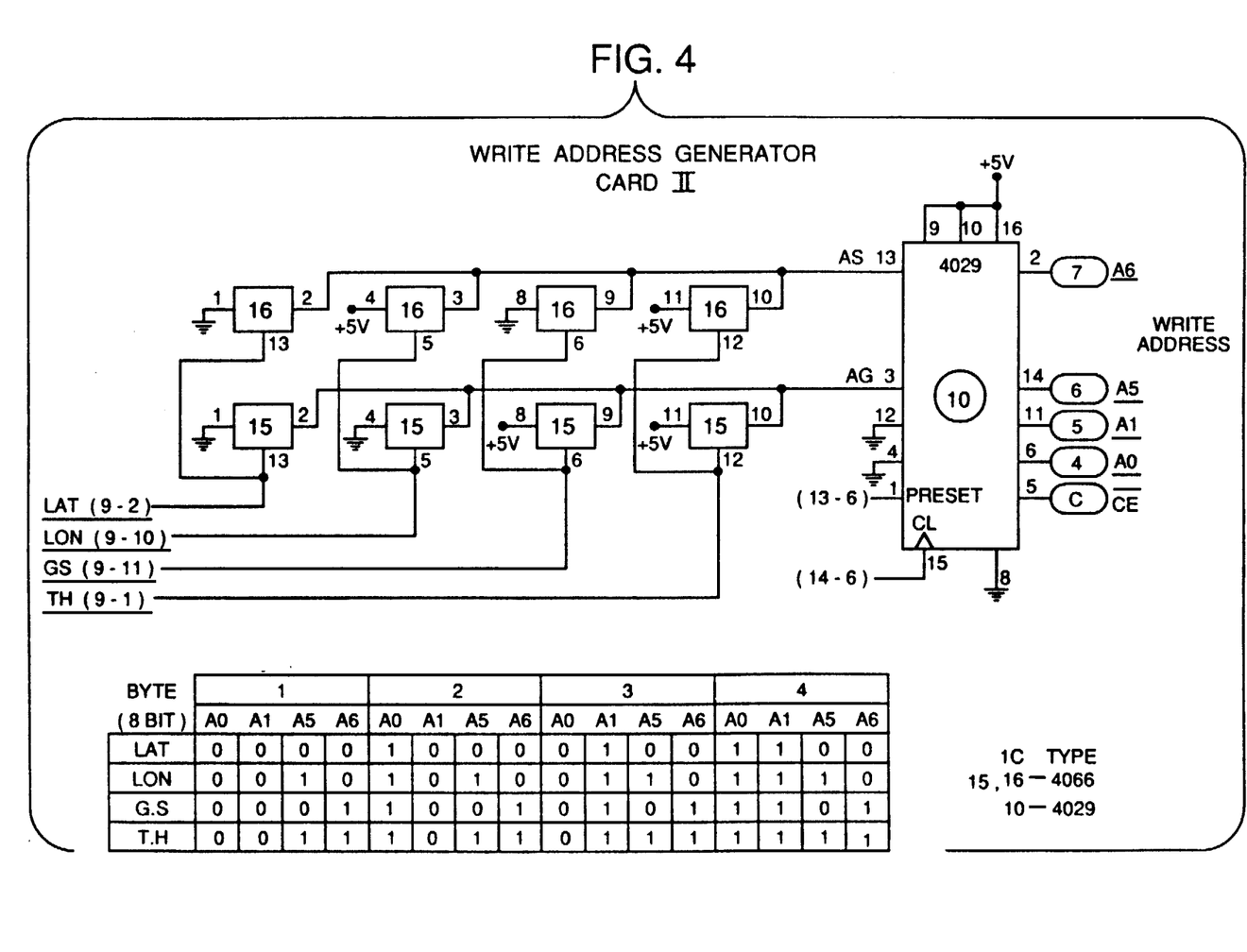
FIG. 4 is an illustration of the address generator with a title of addresses for 8 bit words.

The reader's attention is now directed towards FIGS. 2-8, which are circuit diagrams of the five integrated circuit (IC) cards which were fabricated to serve as the prototype of the system of FIG. 1. FIG. 2 is an electrical schematic of the electrical components of Card I. Card I serves as the INS Bus Interface. All of the elements of FIGS. 2-8 are composed of commercially available zener diodes, amplifiers, capacitors and resistors whose units are depicted on the figures. The nature of the function of each card are discussed below. FIG. 3 is a map which shows how FIGS. 3a-3c combine to form an electrical schematic of the write address generator 103 of FIG. 1, and was fabricated as Card II in the prototype of the present invention. FIG. 4 is an electrical schematic of the Write Address Generator of FIG. 1 which was also included on Card II of the prototype.

Figure 5:
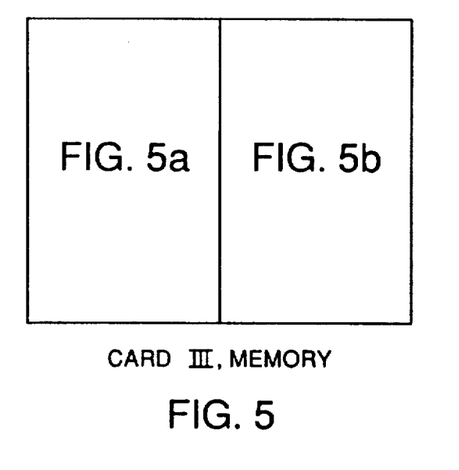
FIG. 5 is a map which shows how FIGS. 5a and 5b fit together.
Figure 5A:
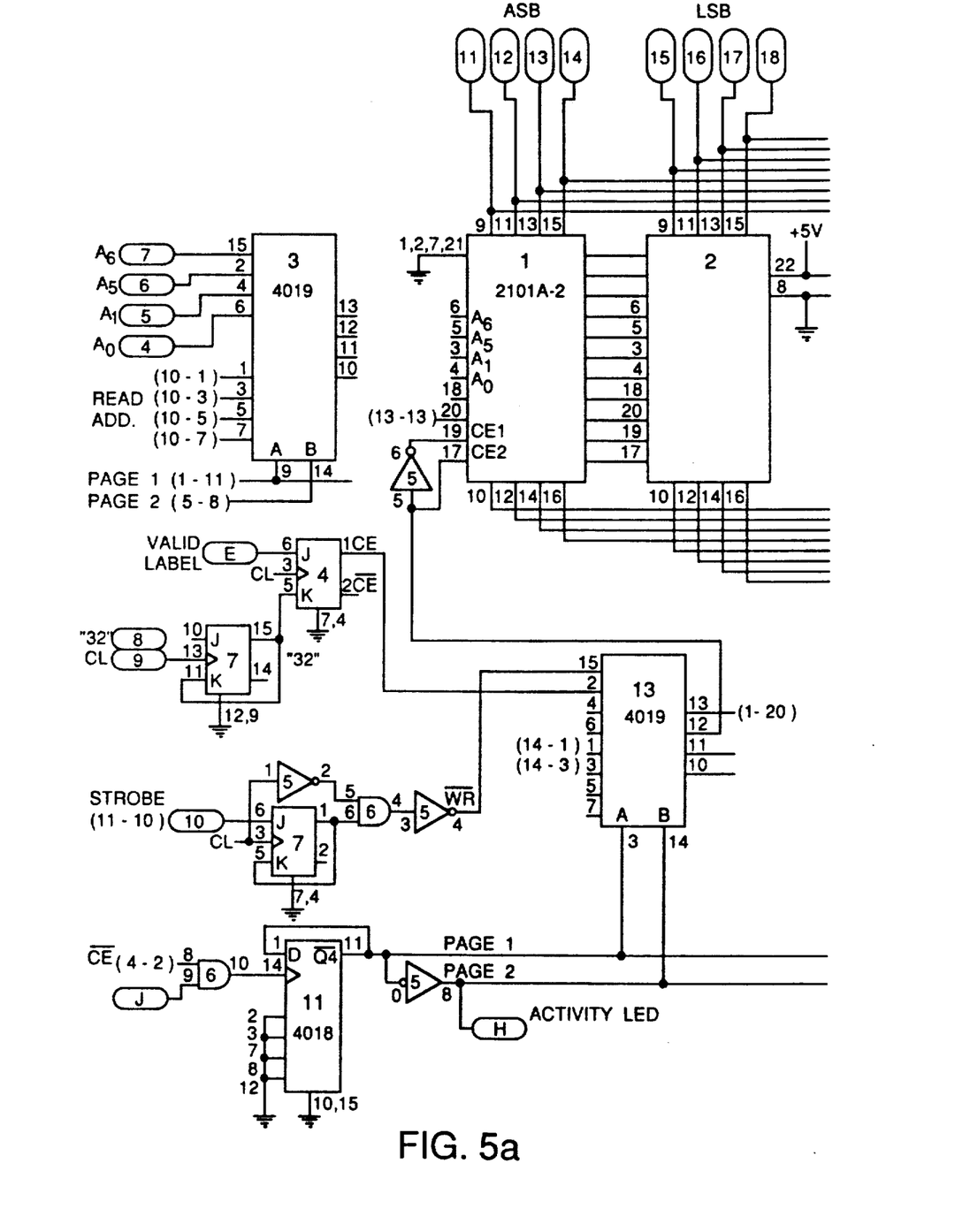
FIGS. 5a and 5b combine to form an electrical schematic of the memory of Card III.
Figure 5B:
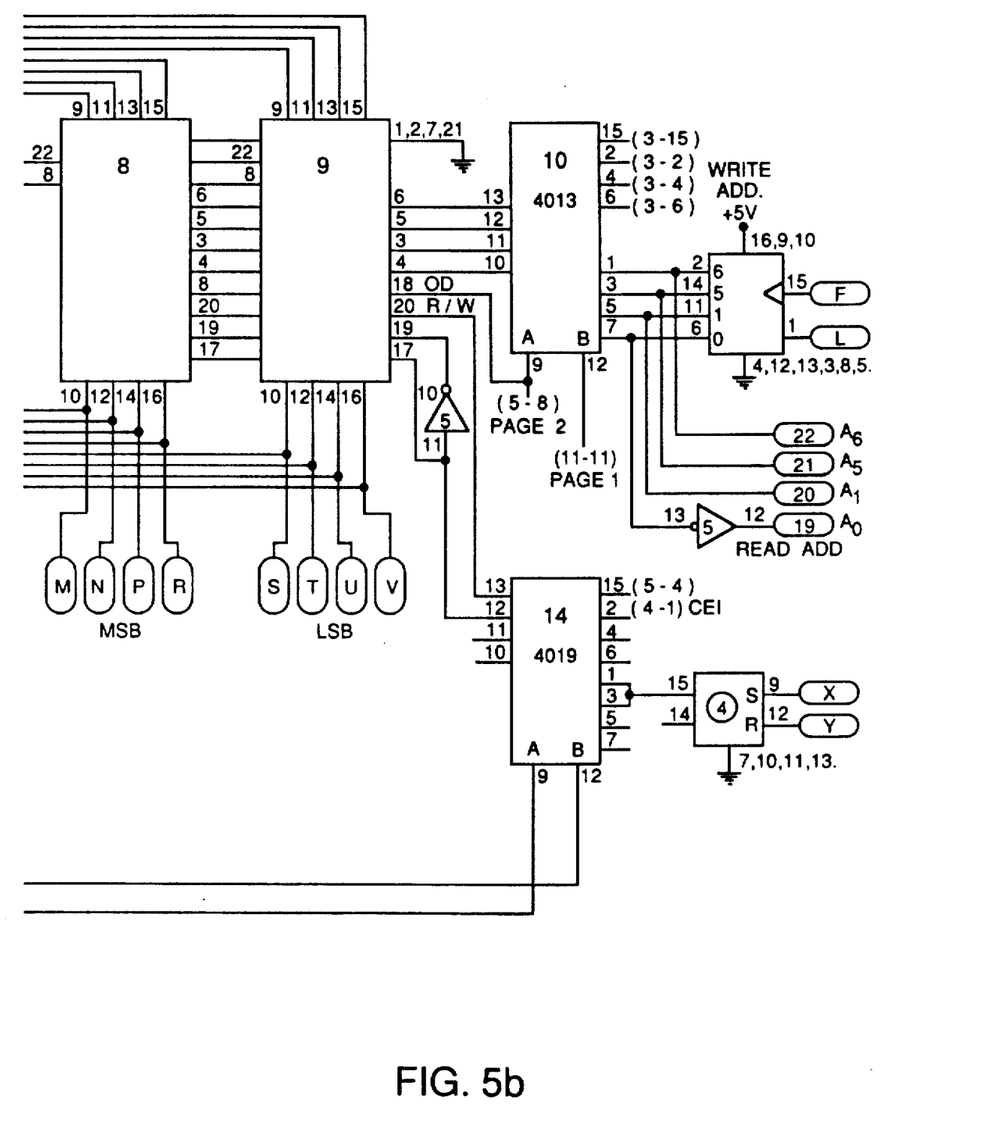
Figure 6:
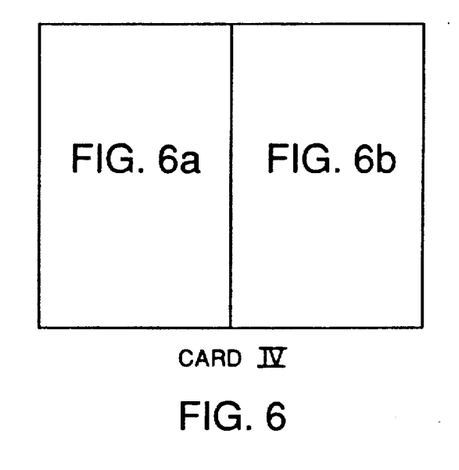
FIGS. 6a-6b combine to form an electrical schematic of the circuit of Card IV.
Figure 6A:
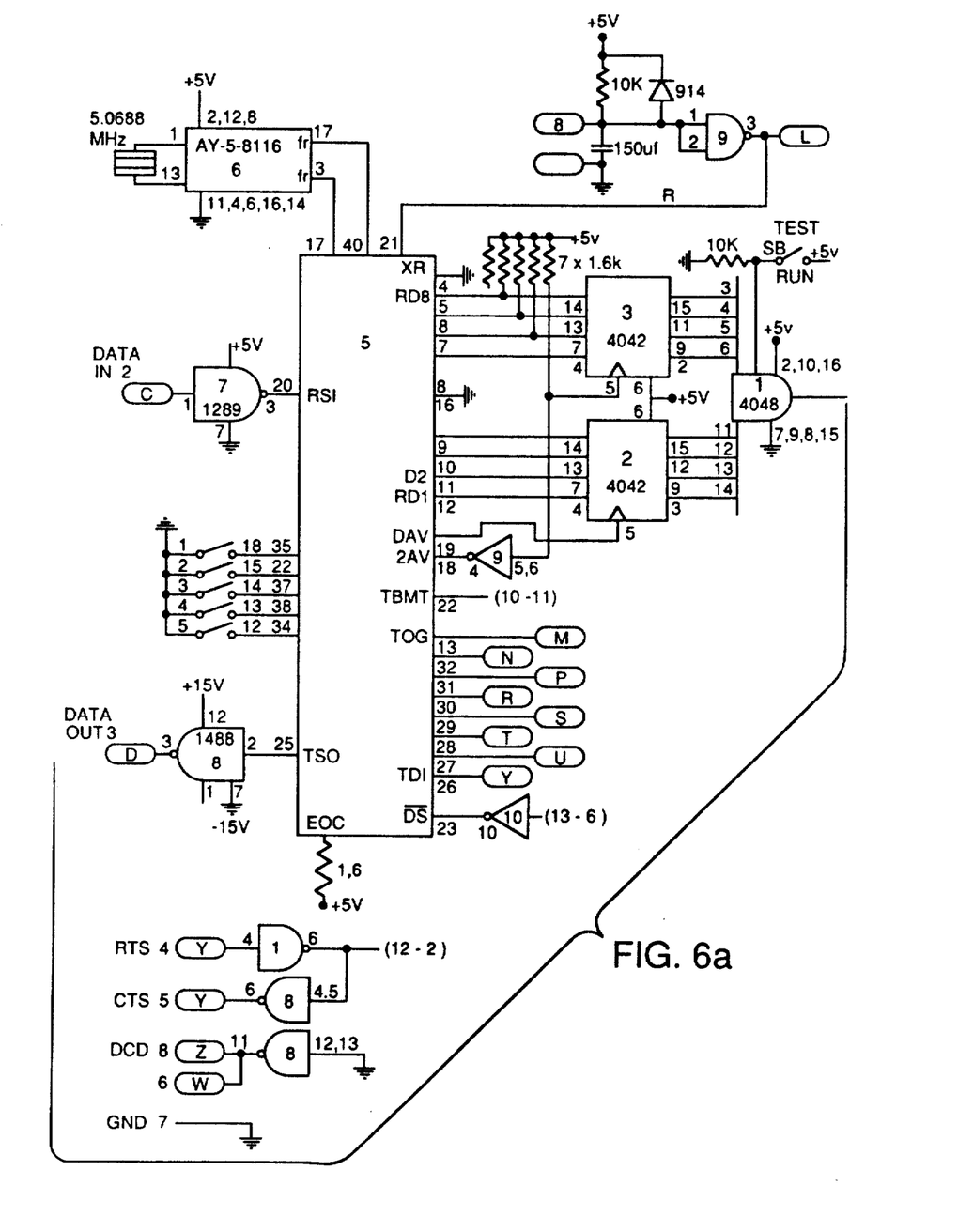
Figure 6B:
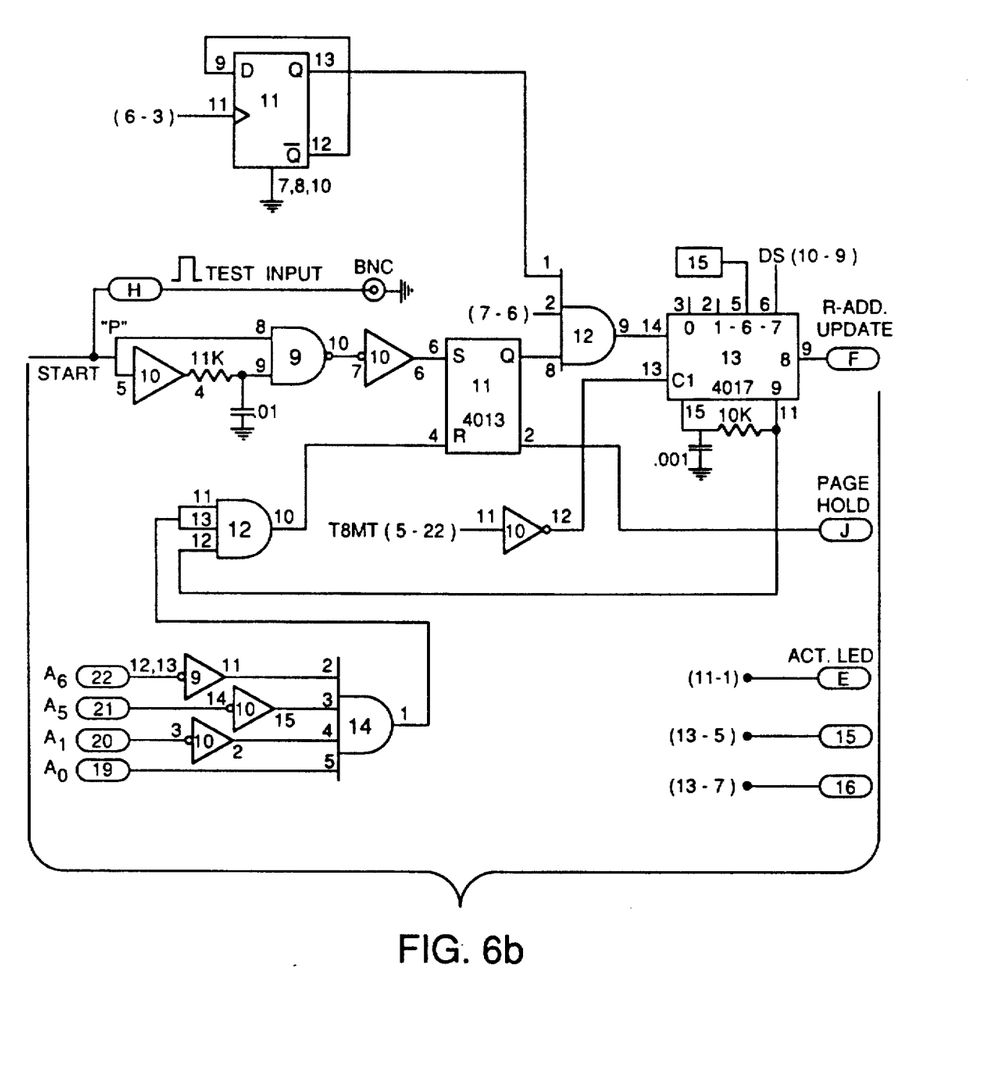
Figure 7:
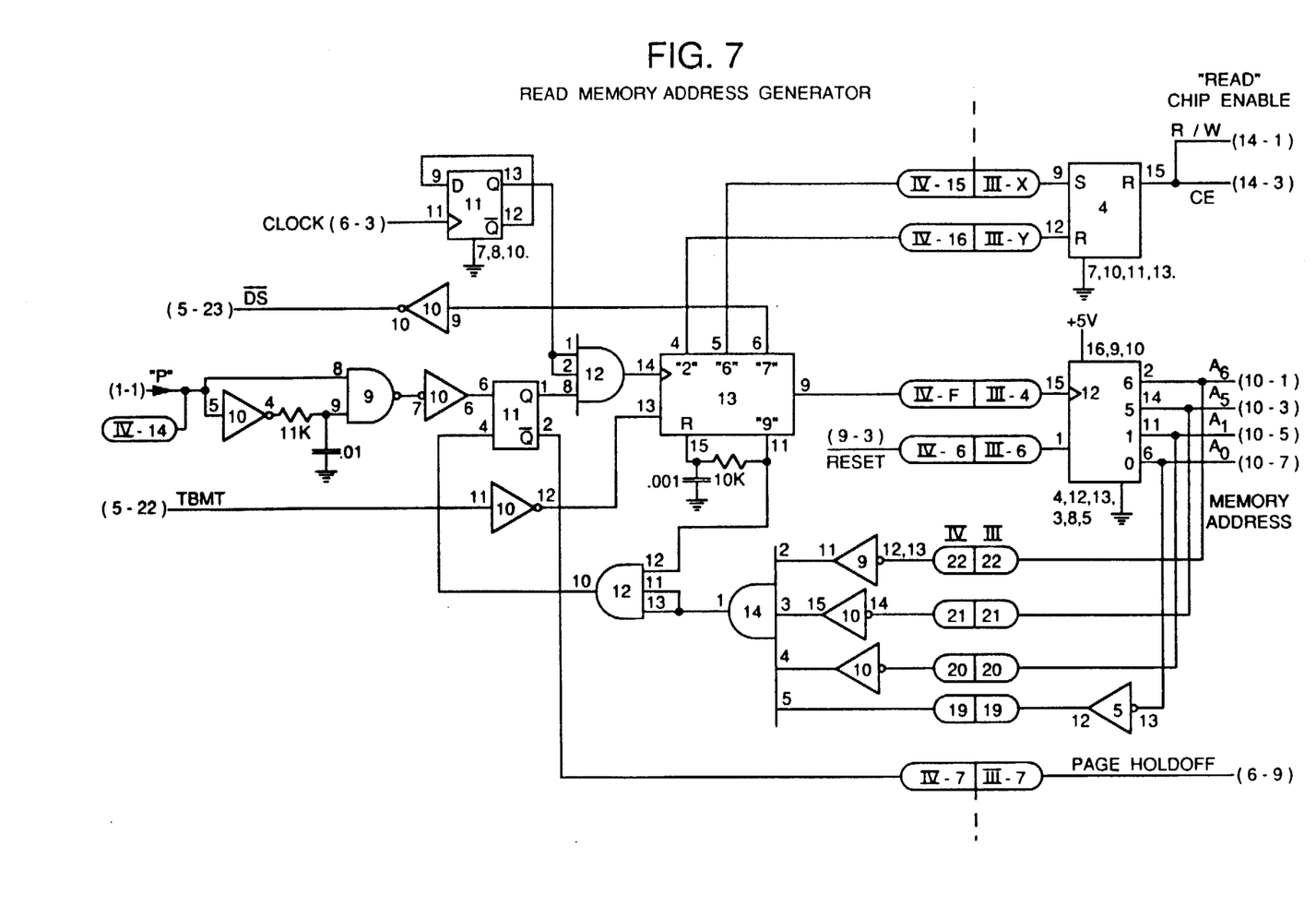
FIG. 7 is an electrical schematic of the read memory address.
Figure 8:
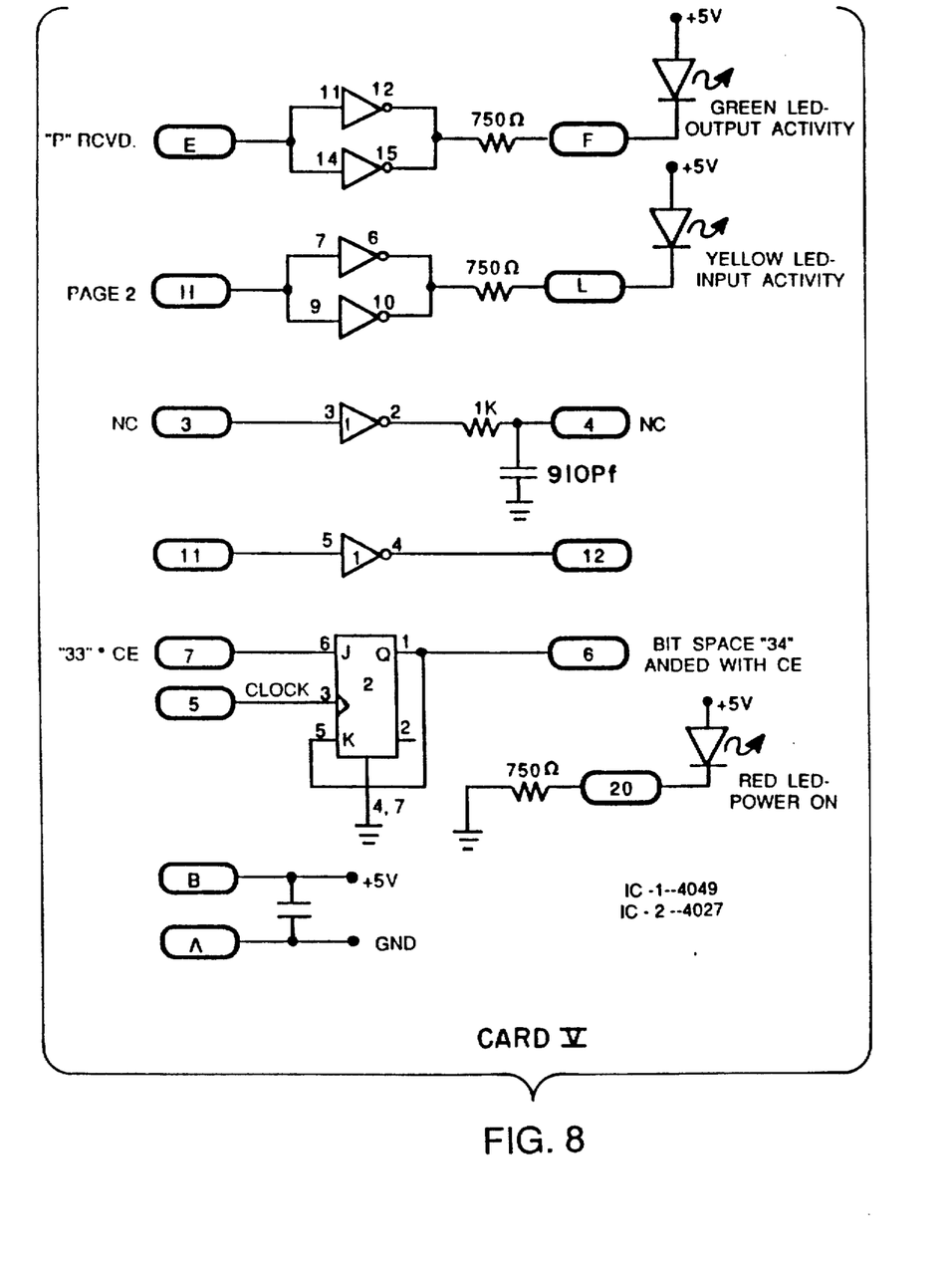
FIG. 8 is an electrical diagram of the elements of Card V.

FIG. 5 is a map which shows how FIGS. 5a-5b combine to form an electrical schematic of the page 1 and page 2 memory of FIG. 1, which was fabricated as Card III in the prototype. FIG. 6 is a map to show how FIGS. 6a-6c combine to form an electrical schematic of the output of the present invention, and was fabricated as Card IV in the prototype. FIG. 7 is an electrical schematic of the Read Address Memory Generator 105 of FIG. 1, and also shows the interconnection of the terminals of Card IV to Card III. FIG. 8 is an electrical schematic of Card V of the prototype of the present invention.

Starting with the connection to the INS Bus, Card I (FIG. 2) provides the buffer between the box and the bus. The three AD521 instrumentation amplifiers sense the voltages on the bus with minimum loading the amplifiers can stand ±30 V with the power on or off at either input terminal and also should an amplifier fail producing an input short, the 51K series resistors will prevent a bus overload. The gain is set for 0.37 producing an output voltage swing of 4.4 V for the +12 V input. The output is clamped at 5.1 V with a zener diode (IN4733) and squared up with the schmitt trigger output gate. The offset adjustment potentiometers have the effect of changing the skew between the three signals and can be used to correct skew problems. In practice these adjustments once set, stay put.

Card II (FIG. 3) performs four main functions. First the bit space counter, IC56 and its synchronous decoders for bit space "8," "16," "24," and "32" made of IC 3, 7 and 11. Next IC-8 provides the series to parallel conversion of the input data and divides the 32 bit word into four 8 bit words. IC 12, 9, 13 and 4 make up a label decode and latch section. This action checks each label in turn and produces a "valid label" signal at (13-6) when one of the four wanted words turns up. When this happens, one of the output lines from IC-9 will be latched high indicating latitude, longitude, ground speed or true heading. The last section on this card takes the "valid label" and latched line signals and sets up a starting write address at counter IC-10. This counter is incremented by the bit space signals "8," "24," and "32" through (14-6) to produce addresses for the 8 bit words.

FIG. 4 shows the address counter in detail with a table of addresses for the sixteen 8 bit words.

Figure 9:
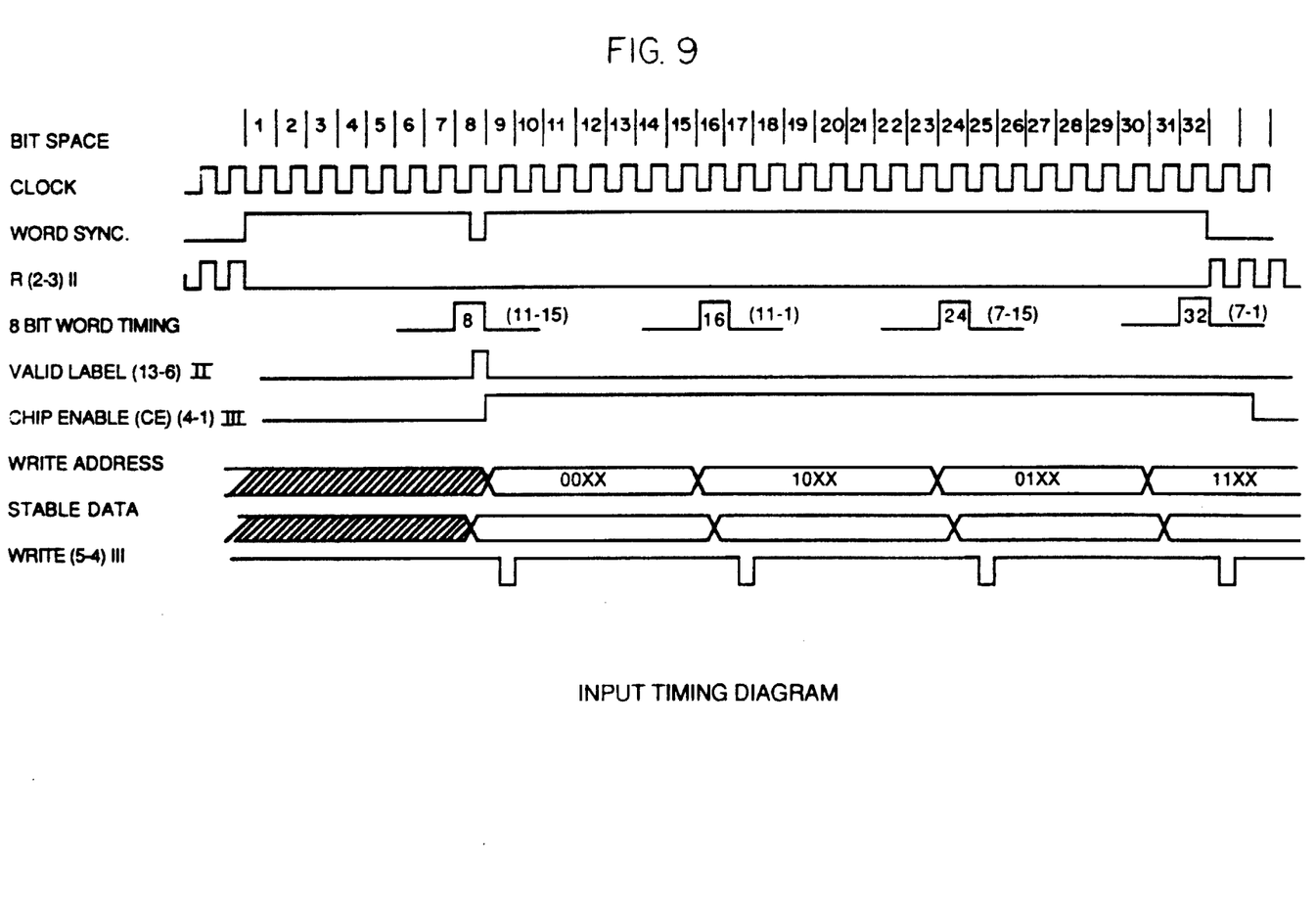
FIG. 9 is a chart of the timing of the input control signals of the system of FIGS. 1-8.

The circuit of the memory card (Card III) is shown in FIG. 5. Each page of memory is made up of two (256×4) static MOS rams. These inputs and outputs are bused together, the inputs are at edge connections 11 to 18. The pages are alternated by four switches IC-3, 10, 13 and 14. IC3 and 10 control the address lines and IC-10 and 13 control the read/write and chip enable (CE) control lines. These switches are controlled by the page control counter (IC-11). The read address counter (IC-12) increments through all sixteen addresses under the control of Card IV the output card. The memory outputs are bused out to the UART on edge connections M to V. The timing of the input control signals chip enable (CE) and write (WR) etc., are shown on FIG. 9, input timing.

Figure 10:
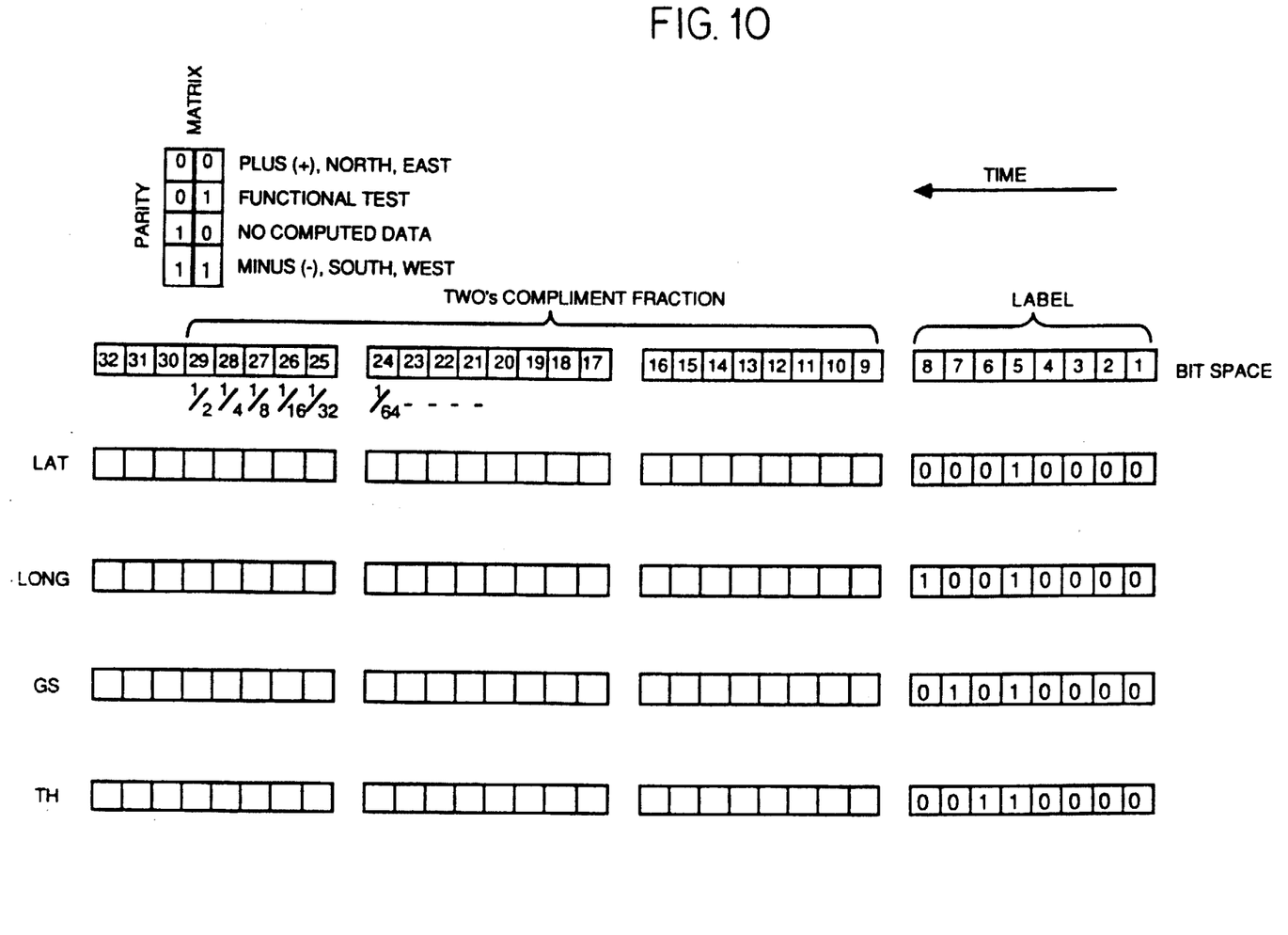
FIG. 10 is a chart of the time sequence of the output words and the breaking up of 32 bit words from the INS into four 8 bit words which are usable by personal computers.

Card IV is the output card and is under the control of the computer through the RS 232 C cable. FIG. 6 shows the wiring of this card. The UART (IC-5) does the data transfer from the memory output to the serial RS 232 C bus. It also receives the input "P" from the computer that results in a start signal, IC-1 PIN 1. The ±12 V levels of the RS 232 C bus are translated to +5 Volt signals by IC-7 and 8. IC-6 with its crystal produce the clock signals for the card and is hard wired for a 2400 baud rate. A dip switch on the board allows one to change the serial format at the UART. At present it is set for no parity, two stop bits and 8 bit words. A power up reset signal is produced at IC-9 PIN 3 and 15 used to initialize the UART. The operation of the memory read sequence circuit is illustrated in FIG. 7 which shows parts of Card IV and III. The rise of the "P" signal at Ic-1, PIN 1 on Card IV sets FFII allowing clock pulses from IC-12 PIN 9 to activate counter IC-13 the decoded outputs of this counter and generate "read" and chip enable signals for the memory and increment the binary address counter, IC-12 on Card III. A data strobe for the UART at IC-10 PIN 10 on Card IV captures the memory input word at the UART Input register. When the UART has sent out the word, the TBMT signal allows the counter IC-13 to advance and bring up the next memory word. When all sixteen words have been sent out and binary counter IC-12 on Card III is full, FFII on Card IV is reset and the transfer stops. The signal from PIN 1 of this FF is used to hold of page changer while data is being transferred out. The output timing diagram (FIG. 10) shows the sequence for output data transfer. The time sequence of the output words and their relationship to the 32 bit input words is shown in FIG. 10. FIG. 8 details Card V that has some bits of circuitry that will not fit on the other cards such as the LED drivers, etc. FIG. 8 details the wiring of the card edge connectors and the power supplies.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A flight data transfer system for use in combination with an inertial navigation system which produces output signals composed of 32 bit words which include: latitude, longitude, true heading and ground speed, said flight data transfer system making the output signals of said inertial navigation system accessible to a personal computer in real time, wherein said inertial navigation system produces its output signals on an INS bus at a 12 volt level, and wherein said flight data transfer system comprises:

a buffer which is electrically connected with said INS bus to receive the output signals of the inertial navigation system therefrom, said buffer reducing the inertial navigation system signals to a 5 volt level and producing output signals composed of serial 32 bit words;

a label decode circuit which is electrically connected to said buffer and which receives said serial 32 bit words therefrom, said label decode circuit breaking up each of said serial 32 bit words into first, second, third and fourth 8 bit words and sending said first 8 bit word to said identifying means since the first 8 bit word always identifies the contents of the 32 bit words;

a series to parallel circuit which is electrically connected with said label decode circuit, and which outputs said second, third and fourth 8 bit words from said label decode circuit;

a memory which receives, stores and outputs said 8 bit output signals produced by said series to parallel circuit to produce output signals thereby;

a means for identifying the 8 bit output signals of said memory by their contents, said identifying means identifying the contents of the 8 bit output signals that contain latitude, longitude, true heading and ground speed; and an interface which electrically connects said memory to said personal computer to provide the output signals of said memory to said personal computer.

2. A flight data transfer system, as defined in claim 1, wherein said identifying means comprises:

a write address generator which receives and forwards said first 8 bit word from said label decode circuit to said memory; and a read address generator which receives and forwards said first 8 bit word from said write address generator to said universal asynchronous received and transmit chip.

* * * * *